United States Patent
Yoshimoto et al.

(10) Patent No.: US 8,466,236 B2
(45) Date of Patent: Jun. 18, 2013

(54) FLUORORESIN COMPOSITION, FLUORORESIN MOLDED ARTICLE AND METHOD FOR PRODUCING THE SAME

(75) Inventors: Hiroyuki Yoshimoto, Settsu (JP); Hirokazu Yukawa, Settsu (JP); Yasuhiko Sawada, Settsu (JP); Taku Yamanaka, Settsu (JP); Masamichi Sukegawa, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 98 days.

(21) Appl. No.: 12/527,510

(22) PCT Filed: Feb. 18, 2008

(86) PCT No.: PCT/JP2008/052655
§ 371 (c)(1),
(2), (4) Date: Aug. 17, 2009

(87) PCT Pub. No.: WO2008/099954
PCT Pub. Date: Aug. 21, 2008

(65) Prior Publication Data
US 2010/0087599 A1    Apr. 8, 2010

(30) Foreign Application Priority Data

Feb. 16, 2007 (JP) .................. 2007-036964

(51) Int. Cl.
*C08L 27/16* (2006.01)
*C08L 27/18* (2006.01)
*C08L 27/00* (2006.01)

(52) U.S. Cl.
USPC ............ 525/199; 525/191; 525/200

(58) Field of Classification Search
USPC ........................ 525/191, 199, 200
See application file for complete search history.

(56) References Cited

U.S. PATENT DOCUMENTS

| 4,849,284 | A | 7/1989 | Arthur et al. |
| 5,552,210 | A | 9/1996 | Horn, III et al. |
| 2006/0293459 | A1 | 12/2006 | Yoshimoto et al. |
| 2007/0015874 | A1 * | 1/2007 | Globus et al. ............... 525/199 |

FOREIGN PATENT DOCUMENTS

| JP | 40-011642 B1 | 6/1965 |
| JP | 50-010343 A | 2/1975 |
| JP | 61-053349 A | 3/1986 |
| JP | 06-283831 A | 10/1994 |
| JP | 09-012816 A | 1/1997 |
| JP | 11-172065 A | 6/1999 |
| JP | 2000-136280 A | 5/2000 |
| WO | 2005/019336 A1 | 3/2005 |

OTHER PUBLICATIONS

Lewis, Richard J., Sr. Hawley's Condensed Chemical Dictionary 15th Edition John Wiley and Sons, Inc.; Hoboken, New Jersey (2007) p. 1022.*

* cited by examiner

*Primary Examiner* — Irina S Zemel
*Assistant Examiner* — Jeffrey Lenihan
(74) *Attorney, Agent, or Firm* — Sughrue Mion, PLLC

(57) ABSTRACT

The invention provides a fluororesin composition capable of providing a molded article having low relative dielectric constant, excellent in a temperature stability and causing only small transmission losses. The invention is a fluororesin composition wherein a rate of change in relative dielectric constant between 25° C. and 80° C. of a molded article produced therefrom under a standard condition is not greater than 0.2%.

6 Claims, 1 Drawing Sheet

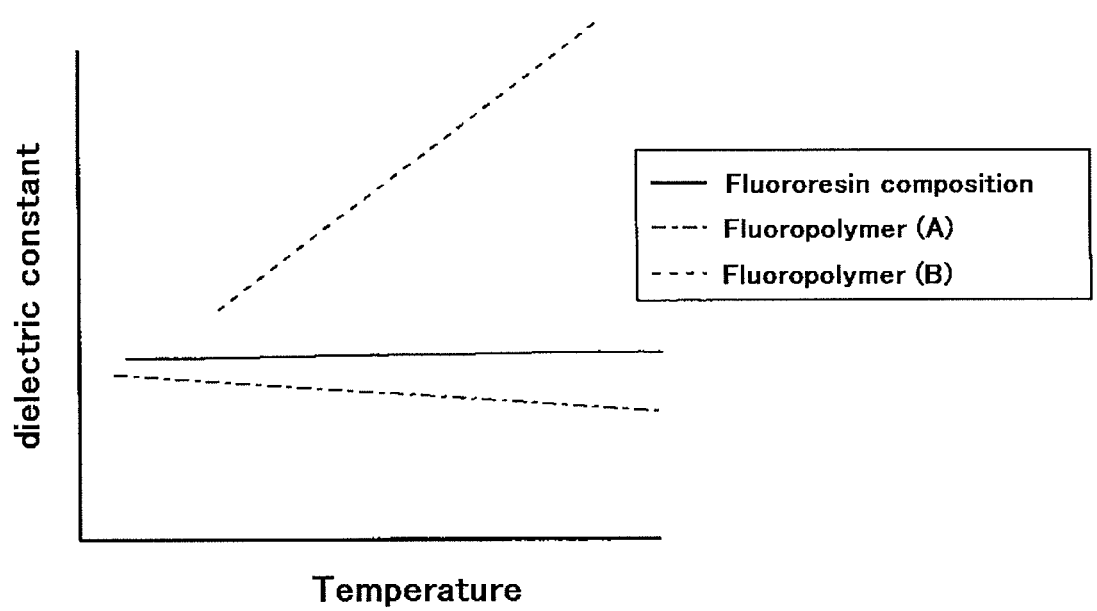

FLUORORESIN COMPOSITION, FLUORORESIN MOLDED ARTICLE AND METHOD FOR PRODUCING THE SAME

TECHNICAL FIELD

The present invention relates to a fluororesin composition, a fluororesin molded article and a method for producing the same.

BACKGROUND ART

In radio communication fields such as cellular phone systems and in computer-related fields, information is transmitted by utilizing high-frequency waves of at least 1 GHz, and such high-frequency transmitting products as coaxial cables and printed circuit boards, which are low in dielectric constant, are used in high-frequency transmission lines for information transmission. A polytetrafluoroethylene [PTFE] resin or a like fluororesin, which are low in dielectric constant, are used as a resin constituting such high-frequency transmitting products.

However, a fluororesin shows changes in dielectric constant as the temperature changes. For example, when a fluororesin is used as a material of outdoor radio communication antennas in cellular phone base stations and the like, a temperature of the outdoor antennas rises to about 80° C. in the summer daytime and the antennas show decreases in dielectric constant as compared with a case where they are at ordinary temperature, namely at about 25° C., with the result that the transmission line impedance lowers, which sometimes leads to such troubles as mismatching, decreases in transmission efficiency and changes in directivity of antennas.

An electrical substrate material comprising a fluoropolymer material and a silane-coated ceramic filler accounting for 55% by weight of the whole material (cf. e.g. Patent Document 1) and a electrical substrate composite material comprising a polymer matrix and a ceramic filler material comprising two specific ceramics (cf. e.g. Patent Document 2), for instance, have been proposed as a material for moldings excellent in the temperature stability of relative dielectric constant. However, these materials contain a ceramic material in addition to PTFE and therefore have problems in that relative dielectric constant and dielectric loss tangent also become increased.
[Patent Document 1] U.S. Pat. No. 4,849,284
[Patent Document 2] U.S. Pat. No. 5,552,210

DISCLOSURE OF INVENTION

Problems which the Invention is to Solve

In view of the above-discussed state of the art, it is an object of the invention to provide a fluororesin composition capable of providing a molded article having low relative dielectric constant, excellent in a temperature stability and causing only small transmission losses.

Means for Solving the Problems

The present invention provides a fluororesin composition wherein a rate of change in relative dielectric constant between 25° C. and 80° C. of a molded article produced from the fluororesin composition under a standard condition is not greater than 0.2%.

The present invention also provides a fluororesin molded article obtained from the fluororesin composition mentioned above.

The invention further provides a method for producing a fluororesin molded article comprising a step of molding the above-mentioned fluororesin composition and a step of subjecting the resulting molded article to a heat treatment at a temperature not lower than the melting point of a fluoropolymer (B) and not exceeding the melting point of a fluoropolymer (A).

In the following, the present invention is described in detail.

A fluororesin composition wherein a rate of change in relative dielectric constant between 25° C. and 80° C. of a molded article produced from the fluororesin composition under a standard condition is not greater than 0.2%.

The fluororesin composition of the invention is low in relative dielectric constant and causes only small transmission losses and, in addition, makes it possible to produce a molded article improved in a relative dielectric constant temperature stability to such an extent that has so far never been realized. Therefore, even when used as an insulating material in a high-frequency signal transmission product for outdoor use, the above fluororesin composition causes only slight changes in transmission rate upon changes in atmospheric temperature.

In the practice of the invention, the rate of change in relative dielectric constant between 25° C. and 80° C. preferably does not exceed 0.1%, more preferably does not exceed 0.05%.

The relative dielectric constant so referred to herein is measured by a cavity resonator perturbation method using a cavity resonator (frequency: 2.45 GHz) (product of Kantoh Electronics Application and Development Inc.) and a model HP8510C network analyzer (product of Agilent Technologies). A measurement at 80° C. is carried out after placing a test sample and the above-mentioned cavity resonator in an electric furnace maintained at a temperature of 80° C.

The term "molded article molded under a standard condition" as used herein refers to an electric wire tube with an outside diameter ø of 1.68 mm and a length of 100 mm as obtained by covering a silver-plated copper wire having a diameter ø of 0.51 mm, under condition of a cylinder diameter ø of 50 mm, a mandrel diameter ø of 16 mm, a blow-up ratio of 4%, an extrusion die diameter ø of 1.92 mm and an extrusion speed of 10 m/hour, at a drying capstan temperature of 160° C. (3 minutes), a drying furnace temperature of 250° C. (1 minute) and a baking furnace temperature of 380° C. (1 minute), using a preform, 49 mm in width and 280 mm in length, obtained by admixing the test sample (fluororesin composition of the invention) with an extrusion aid (Isopar G, product of Exxon Mobil) in an amount of 16% by mass relative to the total mass of the test sample and the extrusion aid, followed by 18 hours of aging of the mixture at a temperature of 25° C. and further followed by preforming thereof at a pressure of 3 MPa.

The fluororesin composition of the invention generally comprises a fluoropolymer (A) and a fluoropolymer (B).

In the practice of the invention, the fluoropolymer (A) generally has low relative dielectric constant and, in addition, has a characteristic such that relative dielectric constant thereof lowers as the temperature rises in the above-mentioned temperature range of 25° C. to 80° C. (a so-called negative characteristic). On the other hand, the fluoropolymer (B) shows a characteristic such that relative dielectric constant increases with the above-mentioned temperature increase (a so-called positive characteristic). The above fluorororesin composition comprises the fluoropolymer (A) having low relative dielectric constant and showing a negative characteristic in response to temperature changes together with the fluoropolymer (B) relative dielectric constant of which shows a positive characteristic in response to temperature changes and, therefore, the composition can provide a molded article low in relative dielectric constant thereof and, further, very low in changes in relative dielectric constant in response to temperature changes owing to a fact that a decrease in relative dielectric constant as resulting from the fluoropolymer (A) and an increase in relative dielectric constant as resulting from the fluoropolymer (B) cancel out each other (cf. e.g. FIG. 1).

The above fluororesin composition may comprise one or more fluoropolymer (A) species and one or more fluoropolymer (B) species.

The fluoropolymer composition of the invention preferably comprises at least one fluoropolymer (A) selected from the group consisting of polytetrafluoroethylene [PTFE], tetrafluoroethylene [TFE]/perfluoro(alkyl vinyl ether) [PAVE] copolymer [PFA] and TFE/hexafluoropropylene [HEP] copolymer [FEPs] and at least one fluoropolymer (B) selected from the group consisting of polyvinylidene fluoride [PVDF] and vinylidene fluoride [VDF] copolymer so that a molded article obtained may be low in relative dielectric constant and have the good temperature stability.

The respective fluoropolymers constituting the above fluororesin composition are those having no history of being heated to the respective melting points or higher temperatures.

The PTFE as the fluoropolymer (A) includes, within the meaning thereof, not only a TFE homopolymer but also a modified polytetrafluoroethylene [modified PTFE].

The modified PTFE mentioned above is a non-melt-processable copolymer of TFE and a very small proportion of a monomer other than TFE.

As the very small proportion monomer, there may be mentioned fluoroolefins such as HFP and chlorotrifluoroethylene (CTFE); fluoro(alkyl vinyl ether) species; fluorodioxoles; perfluoroalkylethylenes; and ω-hydroperfluoroolefins, among others.

In the above modified PTFE, the very small proportion monomer may comprise a single species or two or more species.

In the modified PTFE mentioned above, the very small proportion monomer-derived unit content is generally not higher than 2 mole percent relative to all the monomer units.

The "very small proportion monomer unit content (mole percent) relative to all the monomer units" or "monomer unit content (mole percent) relative to all the monomer units" so referred to herein means a mole fraction (mole percent) of a relevant monomer, from which the monomer units in question are derived, relative to monomers from which the above-mentioned "all monomer units" are derived, namely those monomers constituting the whole above-mentioned fluoropolymer.

In the present specification, the contents of the monomer units such as the above-mentioned very small proportion monomer units are values obtained by carrying out infrared spectroscopic analysis.

In the practice of the invention, the above-mentioned PFA is preferably one having a PAVE unit content of 1 to 5 mole percent relative to all the monomer units.

As a PAVE in the above PFA, there may be mentioned, for example, those having a perfluoroalkyl group containing 1 to 6 carbon atoms and, among them, perfluoro(methyl vinyl ether) [PMVE], perfluoro(ethyl vinyl ether) [PEVE], perfluoro(propyl vinyl ether) [PPVE] and perfluoro(butyl vinyl ether) are preferred among others. Preferred as the PAVE from the heat resistance viewpoint are PPVE, PEVE and PMVE; among them, PPVE is more preferred.

In the practice of the invention, the HFP unit content in the above FEP is preferably 1 to 15 mole percent relative to all the monomer units.

The above-mentioned fluoropolymer (A) preferably has a melting point of 160-350° C. so that a molded article produced therefrom may have good electrical characteristics. A more preferred lower limit to the above melting point is 200° C., and a more preferred upper limit thereto is 330° C.

The melting point of each fluoropolymer as so referred to herein is a temperature corresponding to a peak of an endothermic curve obtained by using a differential scanning calorimeter [DSC] at a programming rate of 10° C./minute in accordance with ASTM D 4591.

The above-mentioned fluoropolymer (A) is preferably PTFE so that a molded article obtained may show low dielectric loss tangent value.

In the practice of the invention, the above-mentioned PTFE is preferably a TFE homopolymer so that a molded article obtained may have good electrical characteristics.

The above-mentioned PTFE preferably has a standard specific gravity [SSG] of 2.14 to 2.19.

When the SSG is higher, the PTFE tends to become poor in moldability and, when it is excessively low, mechanical strength and electrical characteristics tend to become inferior. A more preferred lower limit to the SSG of the above-mentioned PTFE is 2.15 and a more preferred upper limit thereto is 2.18.

The SSG so referred to herein is measured by a water displacement method according to ASTM D 792.

The fluororesin composition of the invention may contain, as the fluoropolymer (A), a fluoropolymer lower in melting point than PTFE, for example a FEP or PFA, in addition to PTFE so that the mechanical strength of a molded article obtained may be increased. When PTFE and such a fluoropolymer are used in combination, the molded article obtained has high mechanical strength even when the PTFE is unsintered, since the fluoropolymer (A) other than PTFE is melted and solidified.

Preferred as the above-mentioned fluoropolymer (B) is the above-mentioned PVDF or VDF copolymer so that a molded article obtained may show the good temperature stability with respect to relative dielectric constant; PVDF is more preferred since it can secure the temperature stability in question in small proportions.

As the VDF copolymer, there may be mentioned, for example VDF/TFE copolymers, VDF/TFE/HFP copolymers, VDF/trifluoroethylene [TrFE] copolymers and VDF/TrFE/HFP copolymers; among them, those having a VDF unit content of not lower than 30 mole percent are preferred and those having a VDF unit content of not lower than 70 mole percent are more preferred.

The fluoropolymer (B) preferably has a melting point of 150-170° C. so that a molded article obtained may show the good temperature stability with respect to relative dielectric constant.

When the fluoropolymer (B) has a melting point lower than the above-mentioned range, the fluoropolymer (B) may be insufficient in the temperature stability.

From a crack resistance viewpoint, the above-mentioned fluoropolymer (B) is preferably one having a MFR of 0.5-20 (g/10 minutes) as measured at 372° C. A more preferred lower limit to the MFR is 1 (g/10 minutes), a more preferred upper limit thereto is 10 (g/10 minutes), and a still more preferred upper limit thereto is 8 (g/10 minutes).

The melt viscosity so referred to herein is measured in accordance with ASTM D 2116.

In the fluororesin composition of the invention, the contents of the fluoropolymer (A) and fluoropolymer (B) are preferably adjusted in a manner such that a decrement in relative dielectric constant as caused by the fluoropolymer (A) and an increment in relative dielectric constant as caused by the fluoropolymer (B) become almost equal to each other so that a molded article obtained may be improved in the temperature stability with respect to relative dielectric constant thereof.

From a viewpoint of the above-mentioned temperature stability with respect to relative dielectric constant, the content of the fluoropolymer (A) in the fluororesin composition of the invention is preferably 95 to 99.9% by mass of the total mass of the fluoropolymer (A) and fluoropolymer (B).

When the above-mentioned content is below the above range, the temperature stability mentioned above may be sometimes insufficient and, when it is in excess of the above range, relative dielectric constant may sometimes become high.

A more preferred lower limit to the above content is 97% by mass of the above-mentioned total mass, a still more preferred lower limit thereto is 99% by mass of that total mass, a more preferred upper limit thereto is 99.7% by mass of that total mass, and a still more preferred upper limit thereto is 99.5% by mass of that total mass.

In cases where the fluoropolymer (A) is PTFE and the fluoropolymer (B) is PVDF, the above-mentioned fluororesin composition preferably has a PTFE content of 95 to 99.9% by mass of the total mass of PTFE and PVDF from a viewpoint of the above-mentioned temperature stability with respect to relative dielectric constant.

A more preferred lower limit to the above PTFE content is 97% by mass of that total mass, a still more preferred lower limit thereto is 99% by mass of that total mass, a still more preferred upper limit thereto is 99.7% by mass of that total mass, and a still more preferred upper limit thereto is 99.5% by mass of that total mass.

The fluororesin composition of the invention may further comprise, in addition to the above-mentioned fluoropolymer (A) and fluoropolymer (B), a thermoplastic resin other than the fluoropolymers mentioned above, for example polyethylene [PE] or polypropylene [PP], at an addition level at which the characteristic features of the invention will not be impaired, for the improvement in the mechanical strength of a molded article to be obtained.

The above-mentioned thermoplastic resin may generally amount to not more than 30 parts by mass per 100 parts by mass of the sum of the fluoropolymer (A) and fluoropolymer (B).

The fluororesin composition of the invention can be obtained by mixing up the fluoropolymer (A) and the fluoropolymer (B), if desired together with the thermoplastic resin mentioned above.

The respective fluoropolymers constituting the above fluororesin composition can be prepared by carrying out such a polymerization method known in the art as emulsion polymerization or suspension polymerization; however, those obtained by emulsion polymerization are preferred since a sufficient extent of dispersion thereof can be attained by carrying out co-coagulation, for instance.

Each of the above-mentioned fluoropolymers may occur as a virgin (as-polymerized) aqueous dispersion, a concentrate thereof, a powder taken out of the aqueous dispersion by coagulation, or pellets prepared from the powder.

As a method of mixing up the fluoropolymer (A) and the fluoropolymer (B), there may be mentioned, for example, (i) a method comprising dryblending the fluoropolymer (A) in powder form with the fluoropolymer (B) in powder form (dry blending method), (ii) a method comprising adding one of the fluoropolymer (A) and fluoropolymer (B) in powder form to an aqueous dispersion of the other fluoropolymer, and (iii) a method comprising mixing an aqueous dispersion of the fluoropolymer (A) with an aqueous dispersion of the fluoropolymer (B).

Preferably, the mixing of the fluoropolymer (A) with the fluoropolymer (B) is carried out to a sufficient extent in order to reduce the deviation in relative dielectric constant or an impedance of the molded articles to be obtained and reduce the reflection loss.

For effecting the above blending sufficiently, the method mentioned above under (iii) is preferably employed.

The fluororesin composition of the invention may take any of such forms as an aqueous dispersion, a powder and pellets provided that the respective fluoropolymers constituting the fluororesin composition are in a state mixed up together; from an easy molding viewpoint, the powder or pellets form is preferred.

The powder form mentioned above can be obtained with ease as a co-coagulate composed of the fluoropolymer (A) and the fluoropolymer (B) by subjecting a mixed dispersion obtained by the above-mentioned method (ii) or (iii) to coagulation treatment.

The fluororesin composition of the invention can provide a molded article excellent in electrical characteristics and in the temperature stability with respect to relative dielectric constant, as mentioned above.

A fluororesin molded article obtained from the above fluororesin composition also constitutes an aspect of the present invention.

A fluororesin molded article of the invention can preferably show a rate of change in relative dielectric constant of 0.2% or lower, more preferably 0.1% or lower, between 25° C. and 80° C.

The fluororesin molded article mentioned above can be produced by a production method of the invention, which is described below.

The method for producing the fluororesin molded article according to the invention comprises a step of molding the above-mentioned fluororesin composition of the invention and a step of subjecting the semi-manufactured molded article to a heat treatment at a temperature not less than the melting point of the fluoropolymer (B).

The method of producing the fluororesin molded article according to the invention can provide a fluororesin molded article excellent in electrical characteristics and showing the good temperature stability with respect to relative dielectric constant by using the above-mentioned fluororesin composition of the invention as the material.

In view of the fact that this production method further comprises the above-mentioned heat treatment at the specified temperature, the fluororesin molded article obtained is (1) low in relative dielectric constant and excellent in mechanical strength as well since it comprises the fluoropolymer (A) as a main material and (2) excellent in the temperature stability with respect to relative dielectric constant and, in addition, rather insusceptible to discoloration and cracking since the fluoropolymer (B) is hardly decomposed in spite of its melting and solidification.

The above-mentioned step of molding is not particularly restricted but may be carried out, for example, by such a conventional molding method as an extrusion rolling, an extrusion coating, a tape lapping, a calendar rolling or a compression molding, as employed according to the intended use of the molded article.

The above molding may be carried out after addition of a processing aid and/or a blowing agent, for instance, to the above fluororesin composition at an addition level at which the characteristics of the fluororesin composition will not be impaired, for the purpose of improving a moldability or improving the mechanical strength of the product molded article, for instance.

The above-mentioned heat treatment is not particularly restricted provided that it is carried out within the above-mentioned temperature range; from a viewpoint of the mechanical strength of the product molded article, however, it is preferably carried out at 160° C. or above, more preferably at 200° C. or above; from a viewpoint of the electrical characteristics of the molded article, it is preferably carried out at 390° C. or below, more preferably at 380° C. or below.

From the viewpoint of the mechanical strength of the molded article to be obtained, the heat treatment in the production method of the invention is preferably carried out at a temperature higher than the melting point of the fluoropolymer (A) so that that fluoropolymer may be sintered. Although such a temperature range is generally higher than the thermal decomposition starting temperature of the fluoropolymer (B), the heat treatment, when carried out only for a short period of time, results in a small extent of decomposition of the fluoropolymer (B) and accordingly can give a molded article excellent in the temperature stability with respect to relative dielectric constant.

For example, when PTFE is used as the fluoropolymer (A) and PVDF as the fluoropolymer (B) and the heat treatment is carried out at a temperature of about 360° C., PTFE, which has a melting point of about 340° C., is sintered and becomes semitransparent and white, while PDVF, which has a decomposition starting temperature of around 360° C., is decomposed. However, even under such temperature conditions, when the heat treatment is carried out for a short period of time, the decomposition of PDVF is slight and no problem arises about the temperature stability with respect to relative dielectric constant and, accordingly, the molded article can be obtained without discoloration.

In accordance with the production method of the invention, a molded article useful as a dielectric material can be obtained even when the heat treatment temperature is lower than the melting point of the fluoropolymer (A).

When PTFE, for instance, is used as the fluoropolymer (A), the molded article obtained by carrying out the above-mentioned step of molding alone has a specific gravity of about 1.6 and relative dielectric constant of about 1.7 while it has a high level of crystallinity of about 99% and shows dielectric loss tangent of almost zero; thus, even when the PTFE is in an unsintered or semi-sintered condition, a molded article suited for use as a dielectric material can be obtained. However, this molded article can be used only as a dielectric material for special uses since it is low in mechanical strength.

Further, when a FEP or PFA is used in addition to PTFE for constituting the fluoropolymer (A) and when the heat treatment temperature is lower than the melting point of the PTFE and not lower than the melting point of the FEP or PFA, the fluoropolymers other than PTFE are melted and allowed to solidify although the PTFE remains unsintered (with high crystallinity); thus, it is possible to obtain the molded article low in both relative dielectric constant and dielectric loss tangent and higher in mechanical strength than an unsintered-PTFE derived molded article.

A heat treatment time in the above-mentioned heat treatment can be properly selected according to the shape and size, the composition and other particulars of the molded article to be produced. In cases where the heat treatment is carried out at a temperature higher than the melting point of the fluoropolymer (A), the treatment time is preferably not longer than 3 minutes.

A more preferred upper limit to the above-mentioned time is 2 minutes and, within such range, the treatment time may be longer than 1 minute.

The fluororesin molded article of the invention may have any form or shape; for lowering relative dielectric constant at elevated temperatures, however, the thickness thereof is preferably 0.3 to 2 mm.

A more preferred lower limit to the thickness mentioned above is 0.5 mm and a more preferred upper limit thereto is 1 mm.

The fluororesin molded article of the invention can be suitably used, for example, as a product for high-frequency signal transmission. This product for high-frequency signal transmission is excellent in mechanical strength and shape stability and low in relative dielectric constant and hardly shows changes in relative dielectric constant in response to temperature changes; therefore, transmission rate can be stably maintained.

The fluororesin molded article mentioned above can generally have relative dielectric constant ($\in r$) at 25° C. of not higher than 2.3. A preferred upper limit to the above-mentioned relative dielectric constant is 2.2.

As the above-mentioned product for high-frequency signal transmission, there may be mentioned, for example, an insulating plate for a high-frequency circuit, an insulating material for a connecting part, a printed circuit board; for a high-frequency vacuum tube base and an antenna cover; a covered electric wire such as a coaxial cable and a LAN cable; and so forth.

The printed circuit board mentioned above is not particularly restricted but include, among others, a printed circuit board for an electronic circuit in a cellular phone, various types of computers, a telecommunication device and the like.

The coaxial cable mentioned above has an insulating covering layer made of the above-mentioned fluororesin molded article of the invention.

The above coaxial cable is not particularly restricted but include, among others, those having a structure comprising an inner conductor, an insulating covering layer, an outer conductor layer and a protective covering layer as laminated in that order from the core toward the periphery. In the above coaxial cable, the insulating covering layer preferably has a thickness of 0.5 to 2 mm.

The insulating covering layer which each of the above-mentioned coaxial cables has is made of the fluororesin molded article mentioned above and, therefore, shows very small changes in relative dielectric constant in response to changes in temperature; thus, those coaxial cables can suitably be used even in outdoor.

Effects of the Invention

The fluororesin composition of the invention, which has the constitution described hereinabove, can give a fluororesin molded article low in relative dielectric constant and excellent in the temperature stability and causing only small transmission losses. The method for producing the fluororesin molded article according to the invention can give the fluororesin molded article mentioned above in a simple and easy manner.

BEST MODES FOR CARRYING OUT THE INVENTION

The following examples, inclusive of a comparative example, illustrate the present invention in further detail. These examples and comparative example are, however, by no means limitative of the scope of the invention.

In the examples and comparative example, the respective measurement values were evaluated by the methods described below.
(1) Melting Point
The melting point is the temperature corresponding to the peak of an endothermic curve recorded in accordance with ASTM D 4591 using a differential scanning calorimeter [DSC] (product of Shimadzu Corporation) at a programming rate of 10° C./minute.

(2) Relative Dielectric Constant and Dielectric Loss Tangent

The test sample prepared by removing the core wire from each covered electric wire obtained was subjected to the respective measurements by the cavity resonator perturbation method using the cavity resonator (frequency: 2.45 GHz) (product of Kantoh Electronics Application and Development Inc.) and a model HP8510C network analyzer (product of Agilent Technologies). The measurement at 80° C. was carried out in the same manner as mentioned above except that the above-mentioned cavity resonator and the test sample were placed in an electric furnace the inside of which was maintained at 80° C.

Example 1

1. Preparation of the Fluororesin Composition

A vessel having a diameter of 180 mm and a capacity of 6000 mL was charged with 2667 g of an aqueous polytetrafluoroethylene [PTFE] dispersion containing, in an amount of 30% by mass, a tetrafluoroethylene [TFE] homopolymer fine powder (SSG: 2.160, average primary particle diameter 0.250 μm, first melting point 340° C.) obtained by emulsion polymerization, 43.3 g of an aqueous poly(vinylidene fluoride) [PVDF] dispersion containing, in an amount of 15% by mass, PVDF (melting point 155° C.) and 2000 g of water, and the resultant mixture was stirred to cause coagulation. The coagulated powder obtained was placed in a drying furnace and dried at a temperature of 140° C. for 18 hours to give the fluororesin composition.

The above fluororesin composition was composed of 99.2% by mass of the PTFE resin and 0.8% by mass of PVDF as calculated on the basis of their amounts charged.

2. Production of the Fluororesin Molded Article

A Molded Article Molded Under a Standard Condition

A 600-gram portion of the above-mentioned fluororesin composition was admixed with a hydrocarbon type extrusion aid (Isopar G, product of Exxon Mobil) in an amount of 16% by mass of the total mass of the fluororesin composition, and the resulting mixture was matured at a temperature of 25° C. for 18 hours. Thereafter, the mixture was preformed using a preforming machine (product of Tabata Industrial Machinery Co., Ltd.) at a pressure of 3 MPa to give a preform, 49 mm in width and 280 mm in length. Using the preform and a silver-plated copper wire with a diameter ø of 0.51 mm as the core, the electric wire covering was performed on a paste extruder (product of Tabata Industrial Machinery Co., Ltd.) with a cylinder diameter of 50 mm under the condition: mandrel diameter ø 16 mm, blow-up ratio 4%, extrusion die diameter ø 1.921 mm, extrusion speed 10 m/hour, drying capstan temperature 160° C. (3 minutes), drying furnace temperature 250° C. (1 minute) and baking furnace temperature 380° C. (3 minutes). The fluororesin-coated electric wire with an outside diameter of 1.68 mm and a length of 100 mm was thus obtained and measured for relative dielectric constant and dielectric loss tangent.

Example 2

The fluororesin composition was prepared and the fluororesin-coated electric wire were produced and measured for relative dielectric constant and dielectric loss tangent in the same manner as in Example 1 except that 6.5 g of a PVDF powder (average particle diameter 150 μm, melting point 155° C.) was added in lieu of the aqueous PVDF dispersion.

The fluororesin composition obtained in this example was composed of 99.2% by mass of the PTFE resin and 0.8% by mass of PVDF as calculated on the basis of their amounts charged.

Example 3

The fluororesin composition was prepared by mixing up 800 g of a PTFE powder (average primary particle diameter 0.25 μm, first melting point 340° C.) and 6.5 g of the PVDF powder mentioned above. Using the fluororesin composition obtained, the fluororesin-coated electric wire was produced and measured for relative dielectric constant and dielectric loss tangent.

The fluororesin composition obtained in this example was composed of 99.2% by mass of the PTFE resin and 0.8% by mass of PVDF.

Example 4

The fluororesin composition was prepared and the fluororesin-coated electric wire was produced and measured for relative dielectric constant and dielectric loss tangent in the same manner as in Example 1 except that 8.9 g of a VDF/trifluoroethylene [TrFE] copolymer powder (copolymerization ratio: VDF/trifluoroethylene=75/25 (mol ratio), average particle diameter 50 μm, melting point 150° C.) was added in lieu of the aqueous dispersion.

The fluororesin composition obtained in this example was composed of 98.9% by mass of the PTFE resin and 1.1% by mass of the VDF/TrFE copolymer as calculated on the basis of their amounts charged.

Example 5

The fluororesin composition was prepared by mixing up a FEP powder (MFR=24) and the above-mentioned PVDF powder in amounts of 99.2% by weight and 0.8% by weight, respectively. The fluororesin composition obtained was pelletized, and the pellets were used to produce the fluororesin-coated electric wire with an outside diameter ø of 1.37 mm by melt extrusion, which was then measured for relative dielectric constant and dielectric loss tangent.

Example 6

The fluororesin-coated electric wire was produced in the same manner as in Example 3 except that the PTFE powder amounted to 99.84% by mass and the PVDF powder to 0.16% by weight. The coated wire was measured for relative dielectric constant and dielectric loss tangent.

Example 7

The fluororesin-coated electric wire was produced in the same manner as in Example 3 except that a modified PTFE powder (average primary particle diameter 0.25 μm, first melting point 339° C., HFP modified) amounted to 99.2% by mass and the PVDF powder to 0.8% by mass. The coated wire was measured for relative dielectric constant and dielectric loss tangent.

Comparative Example 1

The fluororesin composition was prepared and the fluororesin-coated electric wire was produced in the same manner as in Example 1 except that the addition of the aqueous PVDF dispersion was omitted. The coated wire was measured for relative dielectric constant and dielectric loss tangent.

The results are shown in Table 1.

TABLE 1

|  | Example 1 | Example 2 | Example 3 | Example 4 | Example 5 | Example 6 | Example 7 | Comp. Ex. 1 |
|---|---|---|---|---|---|---|---|---|
| Fluoropolymer (A) (wt %) | PTFE 99.20 Aqueous dispersion | PTFE 99.20 Aqueous dispersion | PTFE 99.20 Powder | PTFE 98.90 Aqueous dispersion | FEP 99.20 Powder | PTFE 99.84 Powder | Modified PTFE 99.20 Powder | PTFE 100 Aqueous dispersion |
| Fluoropolymer (B) (wt %) | PVdF 0.80 Aqueous dispersion | PVdF 0.80 Powder | PVdF 0.80 Powder | VdF/TrFE 1.10 Powder | PVdF 0.80 Powder | PVdF 0.16 Powder | PVdF 0.80 Powder | Not used |
| Baking temperature (° C.) | 380 | 380 | 380 | 380 | 380 | 380 | 380 | 380 |
| Relative dielectric constant (25° C.) | 2.029 | 2.029 | 2.029 | 2.044 | 2.049 | 2.029 | 2.044 | 2.022 |
| Relative dielectric constant (80° C.) | 2.029 | 2.028 | 2.028 | 2.042 | 2.048 | 2.025 | 2.044 | 2.014 |
| Change in relative dielectric constant (%) (25° C.-80° C.) | 0 | 0.05 | 0.05 | 0.10 | 0.05 | 0.19 | 0 | 0.40 |
| tanδ | $2.2 \times 10^{-4}$ | $2.2 \times 10^{-4}$ | $2.2 \times 10^{-4}$ | $2.2 \times 10^{-4}$ | $10.2 \times 10^{-4}$ | $2.1 \times 10^{-4}$ | $2.2 \times 10^{-4}$ | $2.1 \times 10^{-4}$ |

With the coated electric wires of Examples 1 to 5 and 7, the rates of change in relative dielectric constant between 25° C. and 80° C. were not greater than 0.1% and, with the coated electric wire of Example 6, the rate of change was not greater than 0.2%, whereas, for the coated electric wire of Comparative Example 1, the rate of change was 0.4%.

INDUSTRIAL APPLICABILITY

The fluororesin composition of the invention, which has the constitution described hereinabove, can give a fluororesin molded article low in relative dielectric constant and excellent in the temperature stability and causing only small transmission losses. The method for producing the fluororesin molded article according to the invention can give the molded article mentioned above in a simple and easy manner.

BRIEF DESCRIPTION OF THE DRAWING

FIG. 1 This is a graphic representation of the relationships between relative dielectric constant and temperature for the fluororesin composition, the fluoropolymer (A) and the fluoropolymer (B) of the invention.

The invention claimed is:

1. A fluororesin composition comprising polytetrafluoroethylene [PTFE] (A) and at least one fluoropolymer (B) selected from the group consisting of polyvinylidene fluoride [PVDF] and vinylidene fluoride [VDF] copolymer,
   wherein the content of the PTFE (A) is 97 to 99.5% by mass of the total mass of the PTFE (A) and the fluoropolymer (B), and
   wherein a rate of change in relative dielectric constant between 25° C. and 80° C. of a molded article produced from the fluororesin composition under a standard condition is not greater than 0.1%.

2. A fluororesin molded article obtained from the fluororesin composition according to claim 1.

3. The fluororesin molded article according to claim 2, which is a product for high-frequency signal transmission.

4. A method for producing a fluororesin molded article comprising the steps of molding the fluororesin composition according to claim 1 and subjecting a resulting molded article to a heat treatment at a temperature not lower than the melting point of the fluoropolymer (B).

5. The method for producing a fluororesin molded article according to claim 4,
   wherein the heat treatment is carried out at a temperature not lower than the melting point of the fluoropolymer (B) and not lower than the melting point of the PTFE A.

6. The fluororesin composition according to claim 1, wherein the fluoropolymer (B) has a melting point of 150-170° C.

* * * * *